United States Patent
Haghighi et al.

(10) Patent No.: US 10,437,479 B2
(45) Date of Patent: Oct. 8, 2019

(54) UNIFIED ADDRESSING AND HIERARCHICAL HETEROGENEOUS STORAGE AND MEMORY

(71) Applicant: Samsung Electronics Co., Ltd., Suwon-si, Gyeonggi-do (KR)

(72) Inventors: Siamack Haghighi, Sunnyvale, CA (US); Robert Brennan, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 302 days.

(21) Appl. No.: 14/561,204

(22) Filed: Dec. 4, 2014

(65) Prior Publication Data

US 2016/0054933 A1    Feb. 25, 2016

Related U.S. Application Data

(60) Provisional application No. 62/039,415, filed on Aug. 19, 2014.

(51) Int. Cl.
*G06F 3/06* (2006.01)
*G06F 12/00* (2006.01)
*G06F 12/06* (2006.01)

(52) U.S. Cl.
CPC .......... *G06F 3/0611* (2013.01); *G06F 3/0658* (2013.01); *G06F 3/0685* (2013.01);
(Continued)

(58) Field of Classification Search
USPC ................................ 711/100, 103, 154, 200
See application file for complete search history.

(56) References Cited

U.S. PATENT DOCUMENTS 5,392,244 A    2/1995    Jacobson et al.
8,554,963 B1   10/2013   Shapiro et al.
(Continued)

FOREIGN PATENT DOCUMENTS

CN    103797770 A    5/2014
EP    1067461 B1     4/2013
(Continued)

OTHER PUBLICATIONS

PCIE Express, Ravi Budruk, MindShare, 2007.*
(Continued)

*Primary Examiner* — Tuan V Thai
(74) *Attorney, Agent, or Firm* — Renaissance IP Law Group LLP

(57) ABSTRACT

According to one general aspect, an apparatus may include a processor, a heterogeneous memory system, and a memory interconnect. The processor may be configured to perform a data access on data stored in a memory system. The heterogeneous memory system may include a plurality of types of storage mediums. Each type of storage medium may be based upon a respective memory technology and may be associated with one or more performance characteristics. The heterogeneous memory system may include both volatile and non-volatile storage mediums. The memory interconnect may be configured to route the data access from the processor to at least one of the storage mediums based, at least in part, upon the one or more performance characteristic associated with the respective memory technologies of the storage media.

30 Claims, 8 Drawing Sheets

(52) U.S. Cl.
CPC ........ *G06F 3/0688* (2013.01); *G06F 12/0638* (2013.01); *G06F 2212/205* (2013.01)

(56) References Cited

U.S. PATENT DOCUMENTS

| | | | |
|---|---|---|---|
| 8,738,860 | B1 | 5/2014 | Griffin et al. |
| 9,037,548 | B1* | 5/2015 | Dolan .................... G06F 3/0689 707/688 |
| 9,047,017 | B1* | 6/2015 | Dolan .................... G06F 3/0653 |
| 2003/0079019 | A1* | 4/2003 | Lolayekar ........... H04L 67/1097 709/226 |
| 2003/0221033 | A1* | 11/2003 | Kim ....................... G06F 13/364 710/113 |
| 2009/0313445 | A1* | 12/2009 | Pandey ................. G06F 9/4856 711/162 |
| 2010/0115172 | A1* | 5/2010 | Gillingham ......... G06F 13/4059 710/310 |
| 2010/0125677 | A1* | 5/2010 | Bouvier ................ G06F 12/126 710/5 |
| 2010/0153617 | A1 | 6/2010 | Miroshnichenko et al. |
| 2010/0325352 | A1* | 12/2010 | Schuette ............... G06F 3/0613 711/103 |
| 2011/0188210 | A1* | 8/2011 | Huang ..................... H05K 1/14 361/735 |
| 2012/0017043 | A1 | 1/2012 | Aizman et al. |
| 2012/0185846 | A1 | 7/2012 | Recio et al. |
| 2012/0210069 | A1 | 8/2012 | Bayer et al. |
| 2013/0263125 | A1 | 10/2013 | Shamsee et al. |
| 2014/0173232 | A1 | 6/2014 | Reohr et al. |
| 2016/0011965 | A1 | 1/2016 | Murphy et al. |

FOREIGN PATENT DOCUMENTS

| | | |
|---|---|---|
| TW | 200400438 A | 1/2004 |
| WO | 2014025454 A1 | 2/2014 |

OTHER PUBLICATIONS

Mlreosoft dictionray, p. 726, Microsoft 2002.*
Microsoft Computer Dictionary, publish 2002.*
IEEE100 The Authoritative Dictionary of IEEE Standard Terms, published 2000.*
Wikipedia, "Memory Hierarchy," downloaded from website (https://en.wikipedia.org/wiki/Memory_hierarchy) on Sep. 27, 2014, pp. 1-4.
Bathen et al., "VaMv: Variability-aware Memory Virtualization," Design, Automation & Test in Europe Conference & Exhibition, 2012, pp. 284-287 (4 pages), IEEE, 2012. (http://nanocad.ee.ucla.edu/pub/Main/Publications/BathenDNG12.pdf).
Final Office Action for U.S. Appl. No. 14/729,026, dated Jan. 5, 2017.
Final Office Action for U.S. Appl. No. 14/729,026, dated Jun. 15, 2018.
Marty et al., "Virtual Hierarchies," IEEE Micro 28, No. 1 (2008), pp. 99-109. (http://research.cs.wisc.edu/multifacet/papers/ieeemicro08_virtual hierarchies.pdf).
Notice of Allowance for U.S. Appl. No. 14/729,026, dated Dec. 14, 2018.
Office Action for U.S. Appl. No. 14/729,026, dated Aug. 18, 2016.
Office Action for U.S. Appl. No. 14/729,026, dated Nov. 9, 2017.
Whatis.Com Dictionary, "Native," 2006.
Wikipedia, "Memory Management Unit," 2014.

* cited by examiner

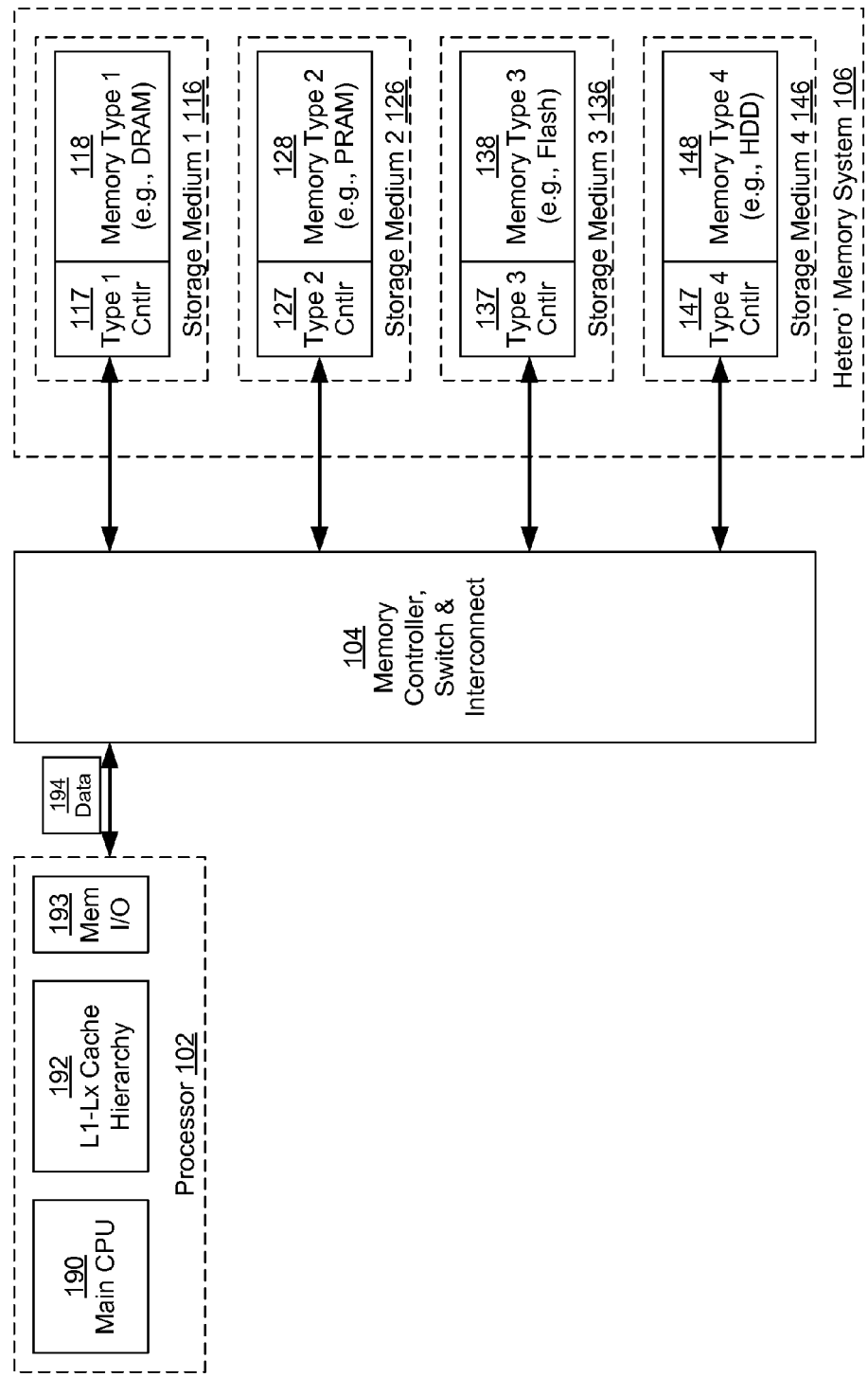

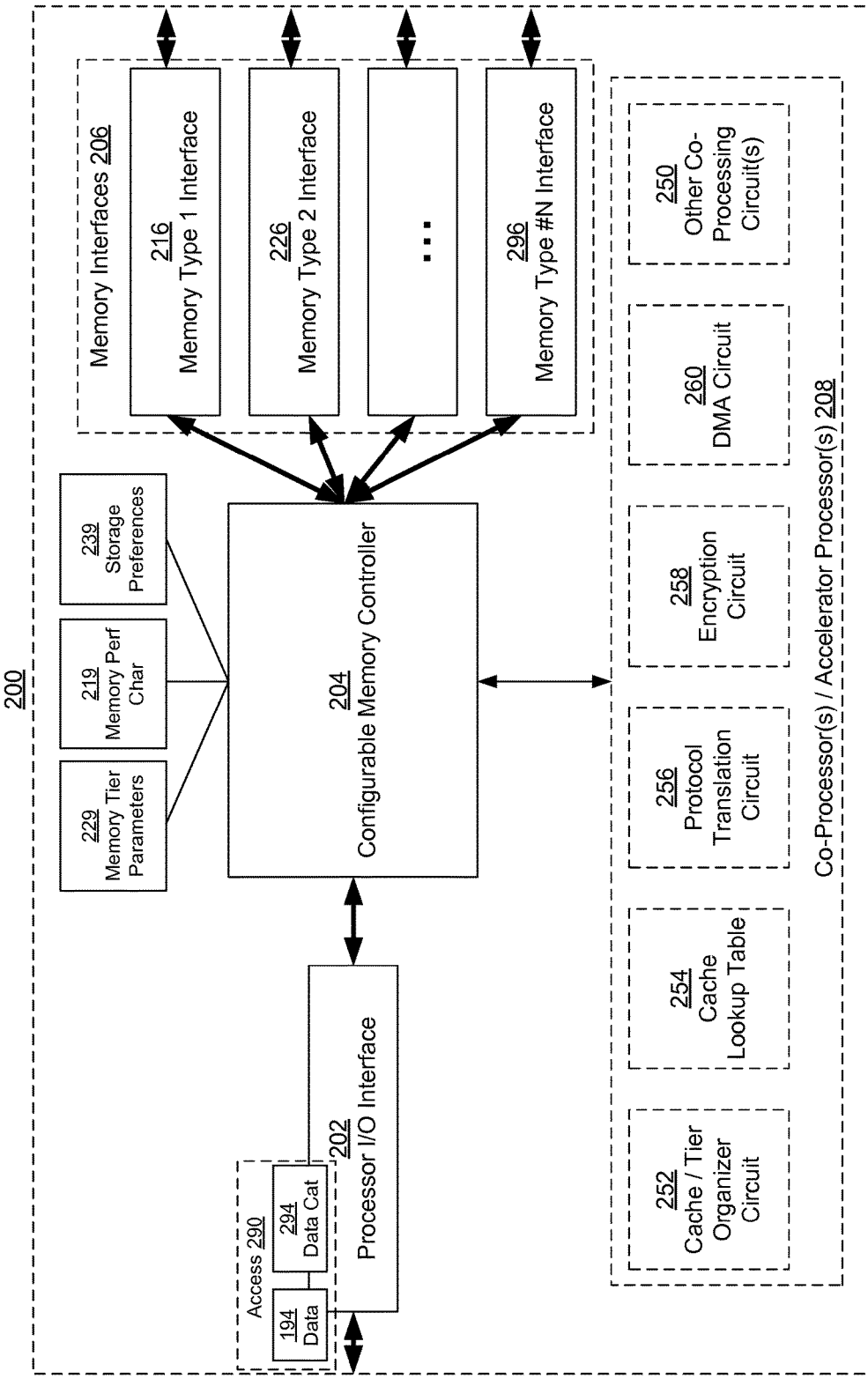

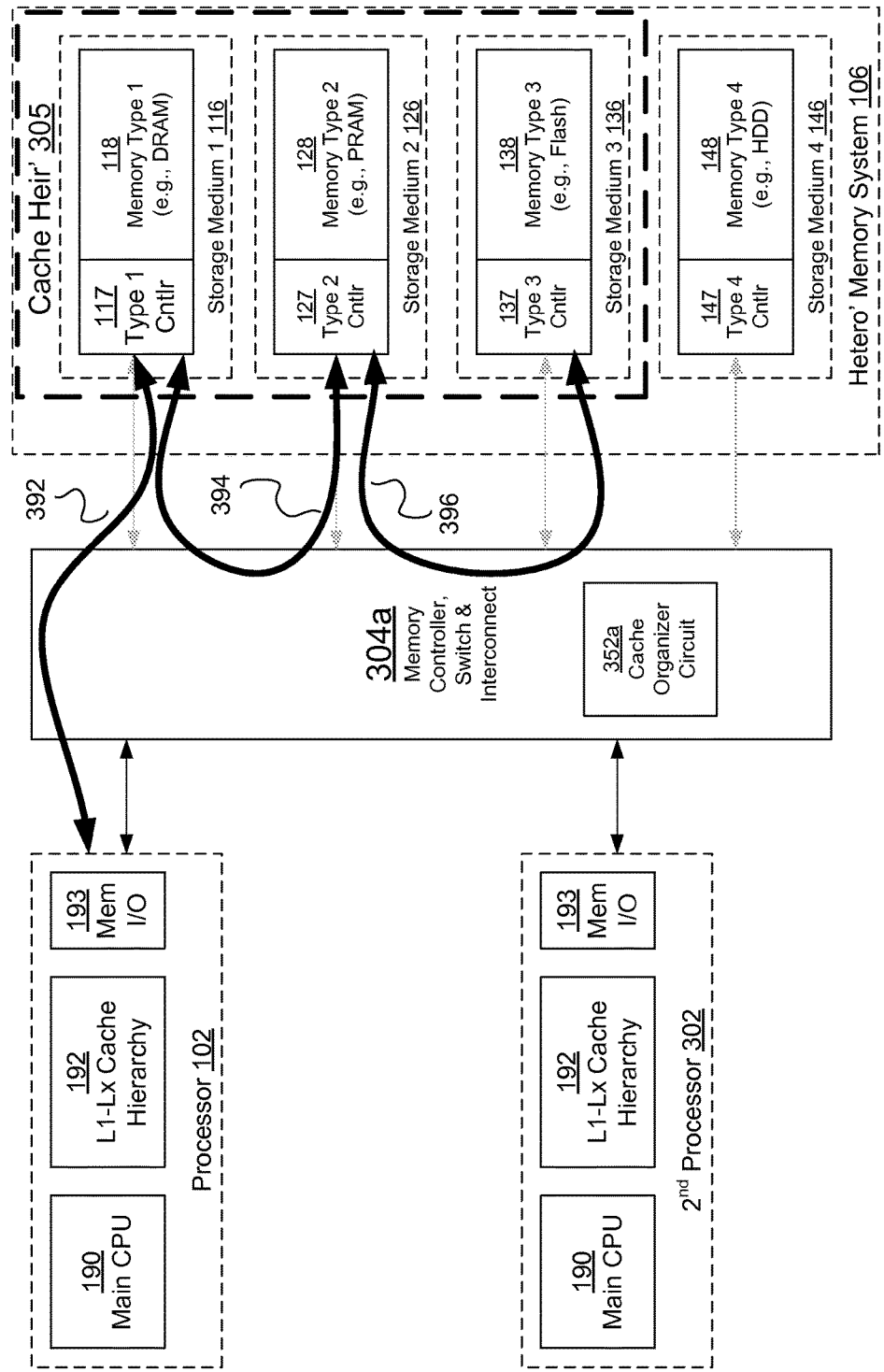

500

UNIFIED ADDRESSING AND HIERARCHICAL HETEROGENEOUS STORAGE AND MEMORY

CROSS-REFERENCE TO RELATED APPLICATION

This application claims priority under 35 U.S.C. § 119 to Provisional Patent Application Ser. No. 62/039,415, entitled "MECHANISM FOR MULTIPROCESSOR OPERATION USING UNIFIED ADDRESSING AND HIERARCHICAL HETEROGENEOUS STORE/MEMORY" filed on Aug. 19, 2014. The subject matter of this earlier filed application is hereby incorporated by reference.

TECHNICAL FIELD

This description relates to data storage, and more specifically to the storage of data within a heterogeneous memory system.

BACKGROUND

The term memory hierarchy is often used in computer architecture when discussing performance issues in computer architectural design. Traditionally, a "memory hierarchy", in a computer storage context, distinguishes each level in the "hierarchy" by response time. Since response time, complexity, and capacity are generally related, the levels may also be distinguished by the controlling technology (e.g., transistor storage, electrically erasable programmable read-only memory, magnetic storage, optical storage, etc.).

Traditionally, a computing device has had several generalized levels within the memory hierarchy. The first and fastest level is the processor's registers and instruction/data cache close to execution units (traditionally comprised of static random access memory (SRAM)). The second and next fastest level may be a unified instruction and data cache with a size much larger than the previous level of cache. This level is usually shared among one or more CPU and other execution or processing units such as Graphics Processing Unit (GPU), Digital Signal Processing (DSP), etc. Outside integrated circuits, some or all of the main or system memory which is traditionally comprised of dynamic RAM (DRAM), may be used as cache. The next level of the memory hierarchy is often very slow compared to the prior levels. It generally comprises magnetic or solid-state memory (e.g., a hard drive or NAND flash technology, etc.) and is known as "secondary storage". The next level is the slowest, and traditionally comprises large bulk medium (e.g., optical discs, tape back-ups, etc.).

SUMMARY

According to one general aspect, an apparatus may include a processor, a heterogeneous memory system, and a memory interconnect. The processor may be configured to perform a data access on data stored in a memory system. The heterogeneous memory system may include a plurality of types of storage mediums. Each type of storage medium may be based upon a respective memory technology and may be associated with one or more performance characteristics. The heterogeneous memory system may include both volatile and non-volatile storage mediums. The memory interconnect may be configured to route the data access from the processor to at least one of the storage mediums based, at least in part, upon the one or more performance characteristic associated with the respective memory technologies of the storage media.

According to another general aspect, a method may include receiving, from a processor, a data access for a heterogeneous memory system. The heterogeneous memory system may include a plurality of types of storage mediums. Each type of storage medium may be based upon a respective memory technology and may be associated with one or more performance characteristic. The method may include determining, by a memory interconnect, a target storage medium of the heterogeneous memory system for the data access based, at least in part, upon at least one performance characteristic associated with the target storage medium. The method may include routing, by the memory interconnect, the data access, at least partially, between the processor and the target storage medium.

According to another general aspect, an apparatus may include a processor interface, a plurality of storage medium interfaces, and a memory controller. The processor interface may be configured to receive a data access directed for a heterogeneous memory system. The plurality of storage medium interfaces may each be configured to communicate with at least one storage medium of the heterogeneous memory system, and each storage medium interface may be associated with at least one performance characteristic. The heterogeneous memory system may include a plurality of types of storage mediums. The memory controller may be configured to route the data access from the processor interface to a one of the plurality of storage medium interfaces based, at least in part, upon at least one performance characteristic associated with the one of the plurality of storage medium interfaces.

The details of one or more implementations are set forth in the accompanying drawings and the description below. Other features will be apparent from the description and drawings, and from the claims.

A system and/or method for to data storage, and more specifically to the storage of data within a heterogeneous memory system, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 2 is a block diagram of an example embodiment of an apparatus in accordance with the disclosed subject matter.

FIG. 3a is a block diagram of an example embodiment of a system in accordance with the disclosed subject matter.

Like reference symbols in the various drawings indicate like elements.

DETAILED DESCRIPTION

Figure 3B:
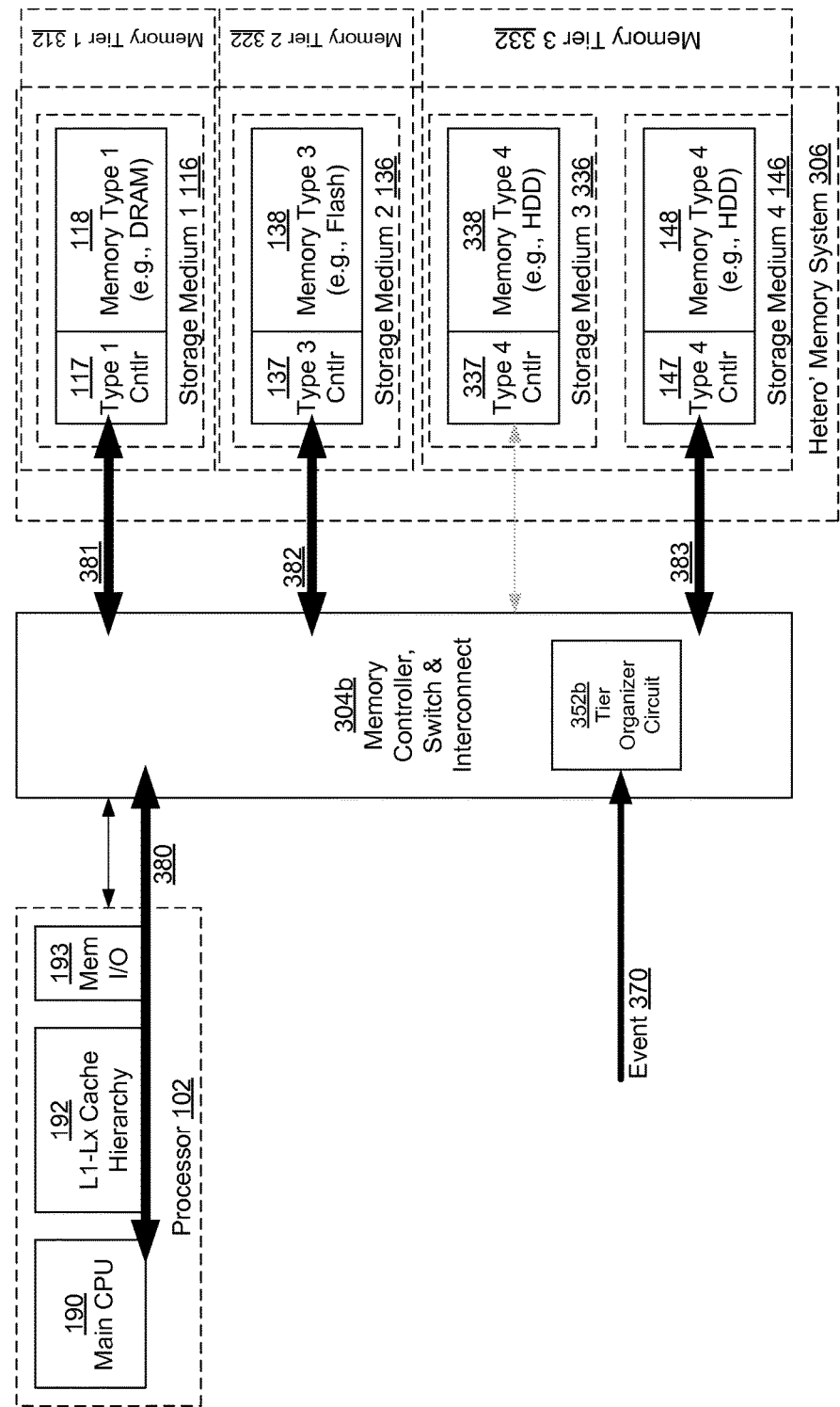
FIG. 3b is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, a mechanism to organize and operate a computing system with a variety of memory and/or storage technologies (e.g. DRAM, NAND, Hard disk, etc.) is shown.

In various embodiments, the system 100 may include a processor 102, a memory controller, switch or interconnect 104, and a heterogeneous memory system 106. In various embodiments, the heterogeneous memory system 106 may include a plurality of different storage mediums (e.g., storage mediums 116, 126, 136, 146, etc.). In such an embodiment, the heterogeneous memory system 106 may include different types of storage mediums based upon a variety of storage technologies. In some embodiments, these technologies may include, but are not limited to, for example, DRAM, Phase-change RAM (PRAM), NAND or flash memory (e.g., SSD, etc.), Resistive RAM (RRAM), Magnetoresistive RAM (MRAM), magnetic memory (e.g., a HDD, etc.), etc. It is understood that the above are merely a few illustrative examples to which the disclosed subject matter is not limited.

Each memory/storage technology may have different power, speed, throughput, capacity and/or cost characteristics. More generally, these characteristics may be referred to as "performance characteristics". Because of these different performance characteristics, storage mediums employing different memory technologies are traditionally segregated within the system. For example, fast but volatile memories (e.g., DRAM, etc.) are accessed by the processor 102 via a first protocol and a first chipset part or circuit (e.g., an integrated memory controller (MCH), a north bridge of a chipset, etc.). Conversely, slower but non-volatile memories (e.g., HDD, SSD, etc.) are accessed by the processor 102 via a second protocol and possibly a second chipset part or circuit (e.g., Input/Output (I/O) Controller Hub (ICH), a south bridge of a chipset, etc.). The use of specific protocols and dedicated circuits makes it difficult to change storage technologies within a system (e.g., due to changing needs, replacing one technology with another, etc.). In the illustrated embodiment, the heterogeneous memory system 106 and the memory interconnect 104 allow a variety of memory technologies to be employed within the same system 100.

In the illustrated embodiment, the system 100 includes a processor 102. The processor 102 in turn may include a main central processor unit (CPU) 190 or plurality of CPU cores. In various embodiments, the CPU 190 may be configured to execute software programs which in turn access and manipulate data (e.g., data 194, etc.). In some embodiments, the processor 102 may include a cache hierarchy 192 that forms the first level in the system 100's memory hierarchy. In various embodiments, the cache hierarchy 192 may include SRAM arranged in multiple levels (e.g., level 0 (L0), level 1 (L1), level 2 (L2), etc.).

When the processor 102 is unable to access the desired data 194 within the cache hierarchy 192, the processor 190 may attempt to access the data 194 (e.g., read the data, write to the data, etc.) via another layer of the memory hierarchy (e.g., within main memory, a hard disk drive, etc.). In the illustrated embodiment, the processor 102 may include a memory input/output (I/O) interface 190 configured to access one or more of the levels of the memory hierarchy that are external to the processor 102.

Further, in various embodiments, the processor 102 may include a memory input/output (I/O) interface 193 configured to communicate with memory. In the illustrated embodiment, this memory I/O interface 193 may be configured to communicate with the memory interconnect 104 and, via the memory interconnect 104, the heterogeneous memory system 106. It is understood that the above is merely one illustrative example to which the disclosed subject matter is not limited.

In the illustrated embodiment, the system 100 may include a memory interconnect 104. The memory interconnect 104 may be configured to route a data access from the processor 102 (e.g., a data write, a data read, etc.) to a target storage medium. In the illustrated embodiment, the target storage medium may be included within the heterogeneous memory system 106.

In some embodiments, the heterogeneous memory system 106 may include a plurality of different types of storage mediums. As a non-limiting example, the heterogeneous memory system 106 may include four different storage mediums (e.g., storage mediums 116, 126, 136, and 146, etc.), each based upon a different memory technology (e.g., DRAM, PRAM, Flash memory, magnetic memory, etc.) and having different performance characteristics (e.g., volatility, speed, a fast write speed, non-volatility, capacity, limited write cycles, etc.). It is understood that the above is merely one illustrative example to which the disclosed subject matter is not limited.

In such an embodiment, it may be desirable to store different pieces of data within different types of memory. As described above, the memory interconnect 104 may be configured to determine which storage medium should store or is storing the data 194 and route the data access from the processor to the desired storage medium. In various embodiments, the memory interconnect 104 may be configured to route the data access to a target or selected storage medium based, at least in part, upon one or more of the performance characteristics of the various storage mediums (e.g., storage mediums 116, 126, 136, and 146, etc.).

For example, a piece of data 194 that is accessed often or is considered temporary might be stored within a volatile but quick storage medium (e.g., the DRAM storage medium 116), whereas a piece of data 194 that is rarely accessed or is stored permanently (or semi-permanently) may be stored within a non-volatile storage medium (e.g., the HDD storage medium 146). It is understood that the above are merely a few illustrative examples to which the disclosed subject matter is not limited.

In various embodiments, the data 194 may be associated with a particular data category or performance indicator (shown in FIG. 2) that provides the memory interconnect 104 with a hint, address range or values, quality of service or instruction as to what type of storage medium or performance characteristics are important or associated with the particular piece of data 194. In various embodiments, each data category may be associated with one or more desirable or optimum memory or storage demands or preferences, such as, for example, access speed (e.g., read and/or write performance), persistence, storage energy efficiency, access size, etc.

For example, if the data 194 is marked or associated with a data category that indicates that the data 194 is temporary, the data 194 may be routed to the DRAM storage medium 116. In such an embodiment, the memory interconnect 104 may determine that the performance characteristics provided by DRAM storage medium 116 are a good (or the best possible) match for the associated data category. It is understood that the above is merely one illustrative example to which the disclosed subject matter is not limited.

In various embodiments, the memory interconnect 104 may be configured to preferentially route the data to one of the plurality of types of storage mediums based upon the data category. In some embodiments, multiple storage mediums may be acceptable for the data. In such an embodiment, the memory interconnect 104 may be configured to rank the acceptable storage mediums based upon one or more criteria (e.g., access speed, volatility, etc.) and then select a target storage medium based upon other factors (e.g., available capacity for storage, available bus bandwidth, available number of write ports, which storage medium is already storing the data, quality of service and reservation, etc.). It is understood that the above are merely a few illustrative examples to which the disclosed subject matter is not limited.

In some embodiments, the data category may be set dynamically by the processor 102 or a piece of software executed by the processor 102 (e.g., an application, an operating system, a device driver, etc.). In another embodiment, the data category may be set statically when the software was compiled or created or at run time based on operating system directions. In yet another embodiment, the one or more data categories may be associated with a particular memory address region or regions. It is understood that the above are merely a few illustrative examples to which the disclosed subject matter is not limited.

As described in more detail in relation to FIG. 2 below, in various embodiments, the memory interconnect 104 may provide the processor 102 with a unified or common interface or protocol for accessing the plurality of storage mediums 116, 126, 136, and 146. Further, the memory interconnect 104 may provide the various storage mediums 116, 126, 136, and 146 with respective interfaces that employ the respective protocols employed by the plurality of storage mediums 116, 126, 136, and 146. In such an embodiment, the memory interconnect 104 may be configured to translate the data access from the unified access protocol to a storage medium specific protocol employed by the storage medium employed to store the data, and vice versa for any responses to the data access.

In various embodiments, each storage medium (e.g., storage mediums 116, 126, 136, and 146) may each respectively include a media controller (e.g., storage controllers 117, 127, 137, and 147) configured to interface with the memory interconnect 104 via an appropriate protocol. In some embodiments, two or more of the storage mediums 116, 126, 136, and 146 may employ the same or a similar protocol. In various embodiments, each storage medium (e.g., storage mediums 116, 126, 136, and 146) may each respectively include a respective memory portion (e.g., storage controllers 118, 128, 138, and 148) configured to store the data.

As described in more detail in relation to FIG. 4 below, in various embodiments, the heterogeneous memory system 106 may include multiple layers of the traditional memory hierarchy. For example, the heterogeneous memory system 106 may include both the traditional second layer of the memory hierarchy (via the DRAM storage medium 116), and the traditional third layer of the memory hierarchy (via the SSD storage medium 136 and the HDD storage medium 146). In such an embodiment, the processor 102 may be freed from the duty of deciding which layer of the traditional memory hierarchy to access. Instead, the memory interconnect 104 may be configured to decide which layer of the traditional memory hierarchy to access.

FIG. 2 is a block diagram of an example embodiment of an apparatus 200 in accordance with the disclosed subject matter. In some embodiments, the apparatus 200 may be or include a memory interconnect (memory interconnect 104 of FIG. 1). In various embodiments, the apparatus 200 may be configured to route a data access 290 from a processor to one of a plurality of storage mediums based, at least in part, upon one or more performance characteristics associated with the respective memory technology of the selected storage medium.

In one embodiment, the apparatus 200 may include a processor I/O interface 202. In such an embodiment, the processor I/O interface 202 may be configured to receive a data access 290 sent from a processor (not shown in FIG. 2, but represented as being connected via the double-sided arrow going off the page). For example, in various embodiments, the processor I/O interface 202 may be configured to interact with a memory I/O interface of a processor (e.g., the memory I/O interface 193 of FIG. 1) The processor I/O interface 202 may also be configured to transmit a result of the data access 290 (e.g., a write confirmation, the requested data 194, etc.) to a processor. In various embodiments, the processor I/O interface 202 may be configured to communicate with the processor via a unified access protocol that allows the processor to access the various storage mediums regardless of the individual protocols they may use.

In various embodiments, the apparatus 200 may include a plurality of memory interfaces 206 (e.g., memory interfaces 216, 226, 296, etc.). In such an embodiment, each of the memory interfaces 206 may be configured to transmit a data access 290 to a respective storage medium (not shown in FIG. 2, but represented as being connected via the double-sided arrow going off the page). Each of the memory interfaces 206 may also be configured to receive a result of a data access 290 (e.g., a write confirmation, the requested data 194, etc.) for a processor. In various embodiments, each of the memory interfaces 206 may be configured to communicate with a specific type of storage medium via a storage medium specific or storage medium type specific protocol. In some embodiments, multiple storage mediums may use or employ the same memory interface. For example, a system may include PRAM and DRAM that make use of similar interface protocols and therefore, may all be accessed by the a universal memory controller 204. It is understood that the above is merely one illustrative example to which the disclosed subject matter is not limited.

In one embodiment, the apparatus 200 may include a configurable memory controller 204. In such an embodiment, the configurable memory controller 204 may be configured to dynamically route a data access 290 between the processor and one of a plurality of storage mediums. As described above, in various embodiments, the configurable memory controller 204 may base the routing decision, at least in part, upon one or more performance characteristics associated with each of the respective storage mediums.

In various embodiments, apparatus 200 may include a set of performance characteristics 219. In such an embodiment, the performance characteristics 219 may indicate one or more performance characteristics associated with each respective memory interface 206, and, via proxy, the storage mediums communicatively coupled with the memory interface 206. In such an embodiment, the performance characteristics 219 may be obtained by scanning or querying the storage mediums (e.g., during boot-up, during device initialization, in response to a triggering event such as a hot swap indication, etc.). In another embodiment, the performance characteristics 219 may be entered, from an outside source (e.g., a program, the internet, a device driver, a user, etc.), into a memory of the apparatus 200 that stores the performance characteristics 219.

In some embodiments, the performance characteristics 219 may include information or values that indicate a relative or a course grained amount of accuracy (e.g., a large design tolerance, a minimum performance guarantee, credit, number of memory banks in a memory chip, number of data bus signals to a memory chip, time required to access a memory page column or row, time for memory read or write access, etc.). Whereas, in another embodiment, the performance characteristics 219 may include information or values that indicate a finely detailed amount of accuracy (e.g., performance characteristics measured from the actual storage device, tight design tolerances, etc.). In yet another embodiment, the performance characteristics 219 may include a variety of levels or granularities of accuracy. It is understood that the above are merely a few illustrative examples to which the disclosed subject matter is not limited.

In the illustrated embodiment, the memory controller 204 may consult or read the performance characteristics 219 and employ the performance characteristics 219 (in whole or part) when deciding which storage medium to service the data access 290. As described below in reference to other figures, other factors may be deemed pertinent when routing the data access 290 (e.g., a cache hit, available storage capacity, an operating mode, such as a low-power operating mode, etc.). It is understood that the above are merely a few illustrative examples to which the disclosed subject matter is not limited.

As described above, in various embodiments, the data access 290 may include a data category indicator 294. In some embodiments, this may take the form of a first message that is transmitted prior to the traditional data access message. In one embodiment, the data category indicator 294 may include a message that indicates that all future data accesses (until the next data category message) are to be considered part of a particular data category. In another embodiment, the data category indicator 294 may include a tag, marker, or field within the data access message 290. In yet another embodiment, the data category indicator 294 may be implicit to the data access message 290. For example, the data access 290 may be to a memory address associated with a particular data category. It is understood that the above are merely a few illustrative examples to which the disclosed subject matter is not limited.

In various embodiments, a memory of the apparatus 200 may store one or more storage preferences 239. These storage preferences 239 may influence how and to where the data access 290 is routed. Examples of storage preferences 239 may include (but are not limited to) a preference to store data in a low power storage medium, a preference to maximize (as much as possible) data throughput, a data stability and/or the reliability of a given storage medium, a preference to not exceed a level of wear upon a storage medium (e.g., for a memory technology that has a limited number of write cycles), etc. These storage preferences 239 may be taken into consideration (along with the performance characteristics 219 and data category 294, etc.) when determining the routing of the data access 290.

As described above, in various embodiments, the memory controller 204 may be configured to compare the data category 294 against memory tier parameters 229 and the performance characteristics 219 of the various storage mediums. The memory controller 204 may then attempt to match the data 194 to a particular storage medium given the prevailing storage preferences 239. The data access 290 may then be routed to the selected or target storage medium, via its associated memory interface 206.

In various embodiments, the storage preferences 239 and/or performance characteristics 219 may be dynamically updated as conditions change for the storage medium. For example, if a storage medium is becoming full or running out of available memory locations to store data 194, this may cause the performance characteristics 219 to be updated. In another embodiment, if a storage medium is experiencing data errors, or more generally exceeds a predefined threshold for some characteristic (e.g., operating temperature, number of errors, number of write cycles to given block, etc.), the performance characteristics 219 may be updated.

In yet another embodiment, if a triggering event occurs to the apparatus 200 or the system that includes the apparatus 200 (e.g., a change in the power supply, a change in physical location, a change in the network employed by the system, an instruction from a user, etc.) the storage preferences 239 may be changed. In some embodiments, multiple sets of storage preferences 239 may exist and which set is selected for use at a given moment may depended upon the environment or settings of the system. For example, if a system (and therefore the apparatus 200) is operating on a substantially unlimited power supply (e.g., electrical power from a wall outlet, etc.), the storage preferences 239 may dictate a preference for performance over reliability (e.g., speed and a tolerance for volatile memory, etc.). Conversely, if the system changes (e.g., is unplugged), and then operated via a limited power supply (e.g., a battery, etc.) a second set of storage preferences 239 may be used that dictate a preference for low power consumption and increased reliability in case of power failure (e.g., a preference for a low power, non-volatile memory, etc.). Another example, of a triggering event dynamically changing the active storage preferences 239 may be a storage medium exceeding a threshold (e.g., becoming too hot, etc.), the storage preferences 239 may then change to avoid the hot storage medium, thus allowing it a chance to cool-down. It is understood that the above are merely a few illustrative examples to which the disclosed subject matter is not limited.

In various embodiments, the apparatus 200 may include one or more co-processor or accelerator processors 208. In such an embodiment, these accelerator processors 208 may be special circuits, functional unit blocks (FUBs), and/or combinatorial logic blocks (CLBs) configured to perform a specific task for the memory controller 204, often as part of the routing operation. In some embodiments, the specific task may include helping to determine to which storage medium the data access 290 should be routed. In another embodiment, the specific task may include transforming or translating the data access 290 or a part thereof (e.g., the data 194) between communication protocols or otherwise as part of the routing operation. In some embodiments, the specific task may be direct memory access (DMA) 260 enabling direct transfer among any of storage mediums 116, 126, 136, 146, etc. It is understood that the above are merely a few illustrative examples to which the disclosed subject matter is not limited.

In one embodiment, the apparatus 200 may include a protocol translation circuit 256 configured to translate a data access 290 in a first protocol (e.g., the unified protocol employed by the processor, etc.) to a second protocol (e.g., a storage medium specific protocol, etc.) and vice versa. In some embodiments, the protocol translation circuit 256 may be considered a co-processor or accelerator processor 208.

In various embodiments, the apparatus 200 may include an encryption circuit 258 configured to encrypt and/or decrypt at least the data portion 194 of the data access 290. In some embodiments, the data 194 may be encrypted as it travels a bus that couples a storage medium with the apparatus 200, or the processor with the apparatus 200. In various embodiments, only a sub-set of the plurality of storage mediums may involve encrypted data. In some embodiments, the encryption circuit 258 may be considered a co-processor or accelerator processor 208.

As described below in reference to FIG. 3a, in various embodiments, the apparatus 200 may be configured to treat the plurality of storage mediums as a cache or cache hierarchy. Traditional cache hierarchies that are tightly integrated with a processor or processor core (e.g., the cache hierarchy 192 of FIG. 1) include mechanisms and structures for detecting if a piece of data is within a cache level (e.g., translation look-aside buffers (TLBs), memory address tags, etc.) and protocols for managing the contents of the entire cache hierarchy (e.g., cache hit/miss messages, snoop messages, cache directories, fill requests, etc.). However, traditional storage mediums, such as main memory (e.g., DRAM, etc.) or secondary storage (e.g., HDDs, SSDs, etc.) lack those structures and communication protocols. In the illustrated embodiment, the apparatus 200 may include structures to perform similar tasks for a plurality of storage mediums that have been organized into a tiered system and operate as a cache hierarchy (that is external to a processor).

In the illustrated embodiment, the apparatus 200 may include a cache or tier organizer circuit 252. In various embodiments, this cache or tier organizer circuit 252 may be configured to organize the plurality of storage mediums into a virtual cache hierarchy or organizational structure (e.g., tiers, groups, etc.). For the sake of example, a cache will be focused upon here, and the organization of tier groups discussed in reference to FIGS. 3b and 3c.

In such an embodiment, the cache organizer circuit 252 may be configured to designate storage mediums as layers in a cache hierarchy. In various embodiments, this may be done based upon one or more of the storage type's performance characteristics. For example, a fast but volatile storage medium (e.g., DRAM, etc.) may be a higher layer in the hierarchy, whereas a slower but non-volatile storage medium (e.g., a HDD, etc.) may be a lower layer in the hierarchy. In some embodiments, the grouping or assignment of layers within the hierarchy may be dictated by a set of memory tier parameters 229 or storage preferences 239.

In various embodiments, as data accesses 290 are processed by the memory controller 204, the issue of where the data 194 is currently stored (or to be stored) may arise. As the storage mediums may lack the ability to process cache-like queries (e.g., a cache hit request, a snoop, etc.), the apparatus 200 or other device may be responsible for keeping track of what data 194 is stored where. In various embodiments, the apparatus 200 may include a cache lookup table 254 configured to track where data 194 or a memory address associated with the data is currently stored.

For example, if the data access 290 is a read request, the cache lookup table 254 may indicate that the data 194 is stored in the highest tier of the virtual cache, and the memory controller 204 may route the data access 290 to the higher tier storage medium (e.g., a storage medium coupled with memory type 1 interface 216, etc.). In another example, the cache lookup table 254 may indicate that the data 194 is not stored in the highest tier of the virtual cache, but in the second highest tier, and the memory controller 204 may route the data access 290 to that storage medium (e.g., a storage medium coupled with memory type 2 interface 226, etc.). It is understood that the above are merely a few illustrative examples to which the disclosed subject matter is not limited.

In another example, if the data access 290 is a write request, the cache lookup table 254 may indicate that space is available for the data 194 in the highest tier of the virtual cache, and the memory controller 204 may route the data access 290 to the appropriate storage medium (e.g., a storage medium coupled with memory type 1 interface 216, etc.). In yet another example, the cache lookup table 254 may indicate that there is no space available for the data 194 in the highest tier of the virtual cache, but the memory controller 204, for various reasons (e.g., as dictated by data category 294, storage preferences 239, etc.), may very much desire to store the data 194 in the highest tier of the virtual cache. In such an embodiment, the memory controller 204 may evict a piece of data from the highest tier and move it to a lower tier (updating the cache lookup table 254 as this is done), and then store the new data 194 in the newly available storage location in the highest tier of the virtual cache. In such an embodiment, the apparatus 200 may be configured to generate or issue data accesses on its own to perform maintenance of the virtual cache. It is understood that the above are merely a few illustrative examples to which the disclosed subject matter is not limited.

In various embodiments, the memory controller 204 may update or maintain the cache lookup table 254 every time any data access 290 to the virtual cache hierarchy occurs. In one embodiment, the cache/tier organizer circuit 252 and/or the cache lookup table 254 may be considered a co-processor or accelerator processor 208.

It is understood that the above are merely a few illustrative examples of a co-processors or accelerator processors 208 to which the disclosed subject matter is not limited. In various embodiments, other co-processing circuits 250 may be included in the apparatus 200 and the co-processor or accelerator processor 208.

FIG. 3a is a block diagram of an example embodiment of a system 300 in accordance with the disclosed subject matter. In various embodiments, the system 300 may be thought to include a variation or different version of the system 100 of FIG. 1.

In the illustrated embodiment, a multi-processor system is shown. In such an embodiment, the system 300 may include a second processor 302. In various embodiments, more processors may exist within the system (e.g., 4, 6, 8, 16 processors, etc.), but only two are shown for illustrative purposes. Likewise, it is understood that a single processor chip or integrated circuit may include multiple CPU cores.

For example, in one embodiment, server enclosures may include multiple multi-processor computing sub-systems, blades, sleds or units. In such an embodiment, data accesses may be issued by any of the multiprocessor blades to a heterogeneous memory system 106. In some such embodiments, the memory controller or interconnect 304a may be included as part of an accelerator sub-system, blade, sled or unit, and the various computing blades may be coupled to the accelerator blade. In such an embodiment, the memory interconnect 304a may be configured to aggregate data accesses from multiple computing units (e.g., processor 102 and 302, etc.) and distribute them to the heterogeneous plurality of storage mediums (e.g., the heterogeneous memory system 106, etc.). In some embodiments, the memory interconnect 304a may also facilitate some local traffic operations such as peer to peer communication between two sub-system memory types.

In various embodiments, if multiple processors are included in a system the system may employ a scheme in which address mapped memory types may be extended using such items as processor ID or similar identifiers. It is understood that the above is merely one illustrative example to which the disclosed subject matter is not limited.

Further, also shown in FIG. 3a is the ability of the memory interconnect 340a to organize the heterogeneous memory system 106 into a cache hierarchy 305. In the illustrated embodiment, the cache hierarchy 305 may include only a subset of the heterogeneous memory system 106, although in another embodiment, the entirety of the heterogeneous memory system 106 may be included. Specifically, in the illustrated embodiment, the cache hierarchy 305 may include the first storage medium 116 (e.g., DRAM, etc.) as the highest tier in the cache hierarchy 305. The cache hierarchy 305 may include the second storage medium 126 (e.g., PRAM, etc.) as the middle tier in the cache hierarchy 305. The cache hierarchy 305 may include the third storage medium 136 (e.g., a FLASH memory, etc.) as the lowest tier in the cache hierarchy 305, and the fourth storage medium 146 (e.g., an HDD, etc.) may remain outside the cache hierarchy 305. It is understood that the above is merely one illustrative example to which the disclosed subject matter is not limited.

As described above, the cache hierarchy 305 may be organized by the memory interconnect 304a, and more specifically a cache organizer circuit 352a included by the memory interconnect 304a. In such an embodiment, the cache organizer circuit 352a may monitor all data accesses to the cache hierarchy 305 and direct the memory interconnect 304a as to where data is stored or may be stored.

For example, the processor 102 may request to read data (via data access 392). The memory interconnect 304a may recognize this data access as being to the cache hierarchy 305 (e.g., as opposed to the forth storage medium 146, or to a specific member of the hierarchy, etc.). In such an embodiment, the memory interconnect 304a may ask the cache organizer circuit 352a (or a lookup table, as described above) which storage medium includes the desired data. In the illustrated embodiment, the data may be stored in the first storage medium 116 and the data access 392 may be routed there. In another embodiment, the data could have been stored in the second storage medium 126 or third storage medium 136 and the data access 392 routed there as appropriate. It is understood that the above is merely one illustrative example to which the disclosed subject matter is not limited.

In another example, the processor 102 may request to write data (via data access 392). Again, the memory interconnect 304a may recognize this data access as being to the cache hierarchy 305 (e e.g., as opposed to the fourth storage medium 146, or to a specific member of the hierarchy, etc.). In such an embodiment, the memory interconnect 304a may ask the cache organizer circuit 352a (or a lookup table, as described above) which, if any, storage medium includes the desired data. In this example, the cache organizer circuit 352a may respond that all three tiers of the cache hierarchy 305 include the data. In such an embodiment, the memory interconnect 304a may select any of the tiers based upon various criteria (e.g., cache tier, data category, performance characteristics, storage preferences, etc.).

In the illustrated embodiment, the data may be stored in the first storage medium 116 and the data access 392 may be routed there. In such an embodiment, the cache organizer circuit 352a may mark, within its internal tables, the copies of the data stored in the third storage medium 136 and the second storage medium 126 as invalid. In such an embodiment, the memory interconnect 304a may be configured to perform cache coherency operations for the cache hierarchy 305.

In one embodiment, the data accesses 394 and 396 illustrate that the memory interconnect 304a may be configured to initiate data accesses on its own. In the illustrated embodiment, this may be done in order to maintain or manage the cache hierarchy 305, although other reasons may occur. Specifically, in one embodiment, once a data write (e.g., data access 392) has updated or written new data to a higher cache level (e.g., storage medium 116), any copies of that data in a lower cache level (e.g., storage mediums 126 and 136) may be considered invalid or stale.

In various embodiments, the memory interconnect 304a may be configured to mirror, within the lower cache levels, the data stored in a higher cache layer. In one such embodiment, this may include mirroring the data within a non-volatile layer of the layered caching memory system 305, if a higher layer of the layered caching memory system 305 that includes the data includes a volatile storage medium.

In the illustrated embodiment, once data is written to the higher cache layer (e.g., storage medium 116), the memory interconnect may initiate data access 394 to write the data to the next cache layer (e.g., storage medium 126). And, again when that is complete the data may be copied to the next cache layer (e.g., storage medium 136), via data access 396. In such an embodiment, once the data has been mirrored it may be deemed to be valid or fresh. Such memory to memory transfers may be facilitated through DMA circuit (e.g., the DMA circuit 260 of FIG. 2). In the illustrated embodiment, the data accesses 394 and 396 are shown as reading the data from the higher cache layer and writing to the lower cache layer. In some embodiments, the memory interconnect 304a may include a buffer or other temporary storage element in which the data may be stored. In such an embodiment, the data accesses 394 and 396 may just include writes from the buffer to the lower cache layers. It is understood that the above is merely one illustrative example to which the disclosed subject matter is not limited.

In various embodiments, memory interconnect 304a initiated data accesses may include reading, writing, moving, modifying and/or deleting data. In such an embodiment, the memory interconnect 304a may perform maintenance operations upon the heterogeneous memory system 106. In another embodiment, the memory interconnect 304a may move data up or down within the cache layers. For example, in one embodiment, as data is accessed more frequently, the memory interconnect 304a may be configured to move the data up the cache hierarchy to provide faster access. Conversely, in another embodiment, as data is accessed less frequently, the memory interconnect 304a may be configured to move the data down the cache hierarchy to increase the available space to store more frequently accessed data. It is understood that the above are merely a few illustrative examples to which the disclosed subject matter is not limited.

FIG. 3b is a block diagram of an example embodiment of a system 301 in accordance with the disclosed subject matter. In the illustrated embodiment, the system 301 may include the memory interconnect 304b. The memory interconnect 304b may include a tier organizer circuit 352b.

In the illustrated embodiment, the system 301 may include the heterogeneous memory system 306. The heterogeneous memory system 306 may be similar to the heterogeneous memory systems of FIGS. 1 and 3a, with a few differences. For example, the third storage medium 336 may be based upon a HDD technology instead of the Flash or NAND technology of FIGS. 1 and 3a. In such an embodiment, multiple storage mediums (e.g., storage mediums 336 and 146) may be based upon similar or the same technology (e.g., magnetic storage, etc.). It is understood that the above is merely one illustrative example to which the disclosed subject matter is not limited.

Further, in the illustrated embodiment, the Flash-based storage medium 136 has been moved from the third storage medium spot and is now the second storage medium. The PRAM-based storage medium of FIGS. 1 and 3a is totally absent from the system 300. In such an embodiment, the heterogeneous memory system 306 includes a DRAM-based storage medium (storage medium 116), a Flash/NAND-based storage medium (storage medium 136), and two magnetic-based storage mediums (storage mediums 336 and 146). It is understood that the above are merely a few illustrative examples to which the disclosed subject matter is not limited.

As described above, the system 300 may organize these different memory/storage types hierarchically into different tiers. In some embodiments, as described above in reference to FIG. 3a, the tiers may be organized into caching layers with one or more tiers optimizing or improving access to other tiers. In other embodiments, such as that illustrated by FIGS. 3b and 3c, the organization may not be cache-based.

In various embodiments, this organization may be performed by the tier organizer circuit 352b and may be based, at least in part, upon memory tier parameters, performance characteristics, and/or data category needs. It is understood that the above are merely a few illustrative examples to which the disclosed subject matter is not limited.

In the illustrated embodiment, the tiers may be organized by storage or memory technologies. In such an embodiment, the first memory tier 312 may include the DRAM or first storage medium 116. The second memory tier 322 may include the NAND or second storage medium 136. The third memory tier 332 may include the magnetic-based storage mediums 336 and 146.

In such an embodiment, when data access 380 is received from the processor 102, the memory interconnect 304b may determine which memory tier (e.g., tiers 312, 322, or 332) will fulfill or service the data access 380. As described above, this decision may be based upon factors such as: the data category of the data associated with the data access 380, the performance characteristics not only of the individual storage mediums but the tiers themselves, and/or a set of storage preferences. In various embodiments, the data access 380 may be routed as data accesses 381, 382, or 383 depending upon the memory tier selected to receive the data access 380.

In various embodiments, the memory tiers may include various complex data structures or storage systems. For example, the third memory tier 332 includes two storage mediums (e.g., storage mediums 336 and 146), and may include a redundant array of independent disks (RAID) form of storage virtualization. Examples of such a RAID organization may include a mirrored array (RAID-1), a co-mingled or striped array (RAID-1), or another form of virtual storage (e.g., a concatenated or spanning array, just a bunch of disks (JBOD) array, etc.). In various embodiments, with other numbers of storage mediums, other forms of arrays may be employed (e.g. RAID-5, etc.).

In another embodiment, a memory tier may include multiple types (Hybrid) of storage mediums (e.g., both SSD and HDD, etc.) and may (or may not) involve a caching architecture that provides a mixture of the performance characteristics of the separate storage mediums. In such an embodiment, the aspects of a tiered or partitioned organization of the heterogeneous memory system 306 may be combined with the aspects of cache hierarchy organization of the heterogeneous memory system 306. For example, in various embodiments, the first tier 312 and third tier 332 may include no caching aspects (or none provided by the memory interconnect 340b), but the second tier 322 may include a cache hierarchy similar to that described above in reference to FIG. 3a.

In a specific example, a tier that provides a hybrid of two or more storage mediums may be primarily based upon magnetic technology storage medium(s) (e.g., an HDD), but have a smaller Flash portion (e.g., a single SSD, etc.) that provides faster access for a small portion of the total data stored by the hybrid tier. In such an embodiment, the two or more distinct storage mediums may be included in a tier and organized as a multiple layered cache hierarchy. In some embodiments, the memory interconnect 304b may mange the caching aspects (e.g., cache hits, cache coherency, etc.), as described above. In other embodiments, a separate memory controller (not shown) may exist to manage such caching aspects. It is understood that the above are merely a few illustrative examples to which the disclosed subject matter is not limited.

In various embodiments, the tier or cache hierarchy may include only a portion of a specific storage medium. For example, in one embodiment, a layer of cache hierarchy may include 25% (or other amount) of a storage medium (e.g., storage medium 136, etc.) and the rest may be reserved for non-caching use. In various embodiments, the memory interconnect 304b may be configured to dynamically adjust the amount or portion of a storage medium that is reserved for a cache or tier. It is understood that the above is merely one illustrative example to which the disclosed subject matter is not limited.

Figure 3C:
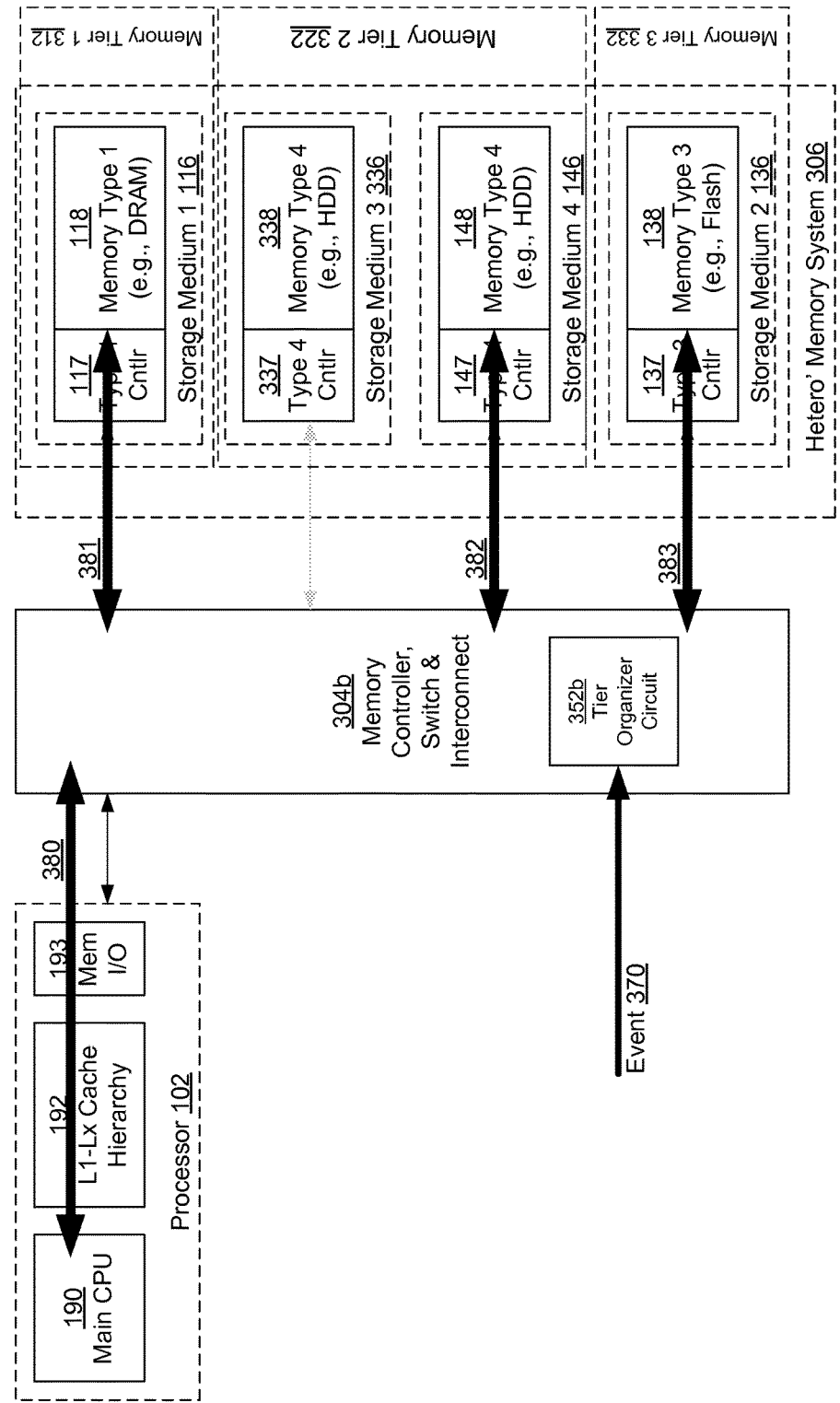
FIG. 3c is a block diagram of an example embodiment of a system in accordance with the disclosed subject matter.

FIGS. 3b and 3c also illustrate the system 301's response to a triggering event 370. As described above, the memory interconnect 304b may be configured to organize the heterogeneous memory system 306 into a hierarchy of storage medium tiers (e.g., tiers 312, 322, and 332, etc.) based, at least in part upon, the one or more performance characteristics associated with each type of storage medium.

In the illustrated embodiment, the memory interconnect 304b has organized the tiers according to speed. In various embodiments, the tiers 312, 322, and 332, may be given preferential treatment in that the first tier 312 is fastest and may be more desirable. Likewise with the second tier 322, and least of all with the third tier 332. However, as shown in FIG. 3b, a triggering event 370 may occur (e.g., storage medium 136 may suddenly exceed an error threshold or a temperature threshold, etc.). As shown in FIG. 3c, upon receipt of this triggering event 370 the memory interconnect 304b may be configured to dynamically re-organize the hierarchy of storage medium tiers (e.g., tiers 312, 322, and 332). In the illustrated embodiment, the tiers have been re-organized (relative to FIG. 3b) such that the faulty storage medium 136 is now the third memory 332, and the two HDD storage mediums 336 and 146 are now the second memory tiers 322. In such an embodiment, the faulty storage medium 136 may be the least preferred storage medium and may be avoided whenever possible. In one such embodiment, the faulty storage medium 136 may only be used to fulfill read data accesses and write data accesses may occur to the other tiers (e.g., data may be slowly and, as transparently as possible to the processor, moved off the faulty storage medium and onto the non-faulty storage mediums, etc.). It is understood that the above is merely one illustrative example to which the disclosed subject matter is not limited.

It is understood that there may be a number of other ways to re-organize the tiers (e.g., tiers 312, 322, and 332) and a number of other triggering events 370 that may cause the memory interconnect 304b to perform a reorganization. While FIG. 3c shows a re-organization in the preference of tiers (e.g., moving the storage medium 136 to the third tier 332, etc.), the storage mediums that are included in various tiers may be re-organized. For example, the second tier 322 may have been re-formed by adding the storage medium 336 to the storage medium 136. In such an embodiment, the Flash-based storage medium 136 may have acted as a cache for the HDD-based storage medium 336 (e.g., providing both speed and storage capacity, etc.). Other forms of tiers are possible, especially given other forms or types of storage mediums (e.g., PRAM, MRAM, etc.). It is understood that the above are merely a few illustrative examples to which the disclosed subject matter is not limited.

Figure 4:
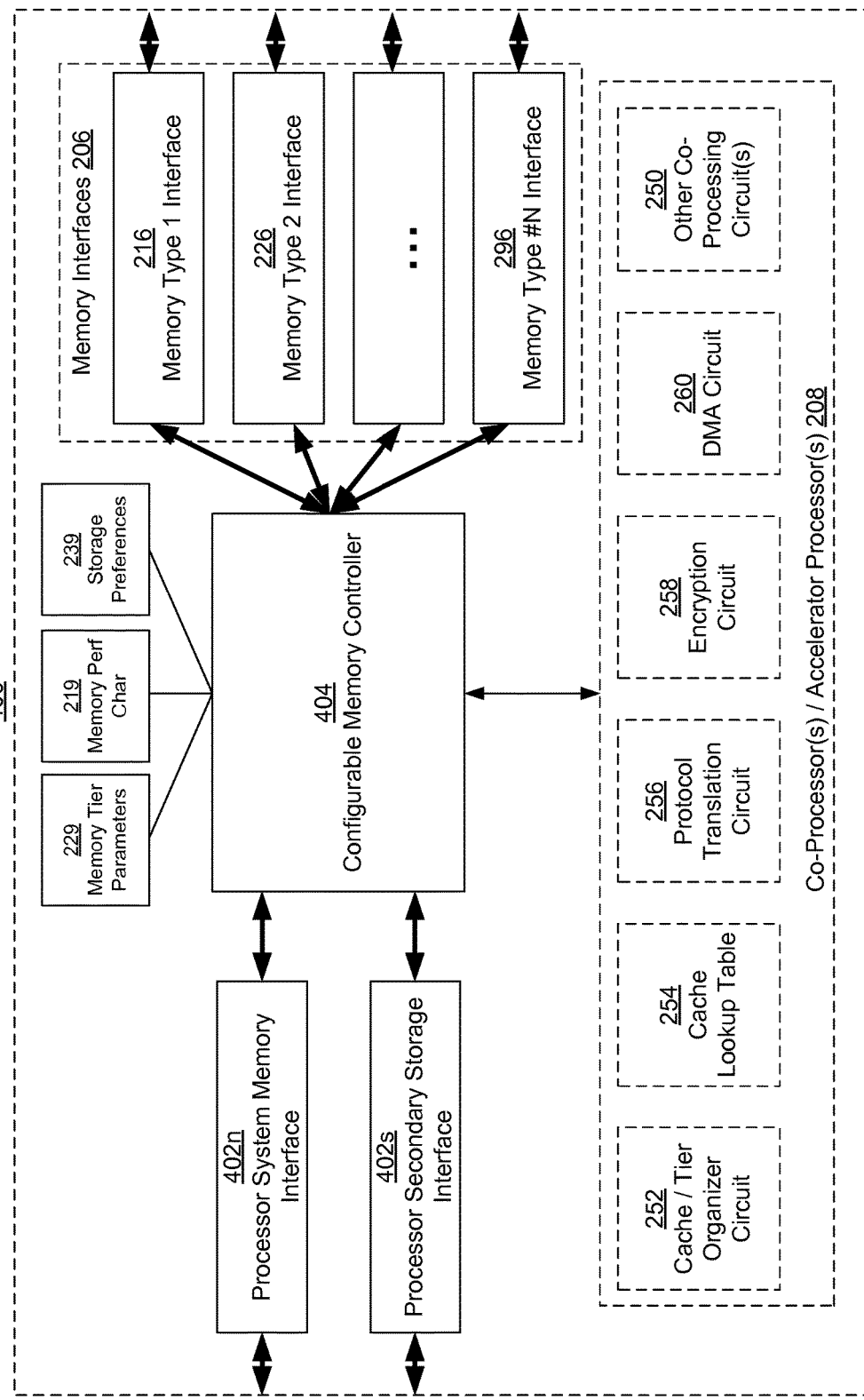
FIG. 4 is a block diagram of an example embodiment of an apparatus in accordance with the disclosed subject matter.

FIG. 4 is a block diagram of an example embodiment of an apparatus 400 in accordance with the disclosed subject matter. The apparatus 400 may be or include a memory interconnect (e.g., memory interconnect 104 of FIG. 1, etc.) and may be similar to the system 200 of FIG. 2. While the system 200 of FIG. 2 illustrates an embodiment in which a unified access protocol is employed by the processor or processors, the system 400 illustrates the use of multiple access protocols by the processor or processors.

Traditionally, a processor interacted with system or main memory (e.g., DRAM, etc.) and any secondary memory (e.g., HDD, etc.) via a portion of a chipset known as a "north bridge". The north bridge separated the communication for the system memory from the communication for the secondary memory. The north bridge would communicate directly with the system memory via a first protocol, and the communication for the secondary memory would be passed to anther portion of the chipset known as the "south bridge". The south bridge then communicated with the secondary memory via a second protocol. Eventually, the system memory portion of the north bridge was moved or integrated into the processor itself (e.g., a memory chip controller (MCC), integrated memory controller (IMC), etc.). Often, the processor communicates directly with the system memory (via the MCC) via the first protocol, and communication with a secondary memory is passed off the chipset (e.g., via an I/O Controller Hub (ICH), Platform Controller Hub (PCH), etc.), which uses a second protocol.

While the embodiment of FIG. 2 makes use of a single unified access protocol to communicate with the memory interconnect, current (and traditional) processors make use of at least two protocols for data accesses (a first for system memory, and a second for secondary memory). Therefore, the use of a single unified access protocol may be used in embodiments in which the processor has changed from the traditional two protocol practice. In the illustrated embodiment of FIG. 4, the apparatus 400 is configured to make use of the multiple protocols employed by traditional processors.

In one embodiment, the apparatus 400 may include a processor system memory interface 402n configured to receive a data access sent from a processor (not shown) and directed to a system memory (e.g., a DRAM, etc.). The processor I/O interface 402n may also be configured to transmit to a processor a result of a data access (e.g., a write confirmation, the requested data 194, etc.) that the processor expected to be made to the system memory. In various embodiments, the processor I/O interface 402n may be configured to communicate with the processor via the first access protocol typically employed by an integrated memory controller (IMC) or similar circuit.

In one embodiment, the apparatus 400 may include a processor secondary memory interface 402s configured to receive a data access sent from a processor and directed to a secondary memory (e.g., a HDD, a SSD, etc.). The processor I/O interface 402s may also be configured to transmit to a processor a result of a data access (e.g., a write confirmation, the requested data 194, etc.) that the processor expected to be made to the secondary memory. In various embodiments, the processor I/O interface 402s may be configured to communicate with the processor via the second access protocol typically employed by an I/O Controller Hub (ICH) or similar circuit.

In various embodiments, the apparatus 400 may include an integrated connection fabric and memory controller 404 configured to process data accesses from both the processor system memory interface 402n and the processor secondary storage interface 402s. In various embodiments, the memory controller 404 (or co-processor circuit 208) may be configured to translate either of these processor protocols to a storage medium based protocol, and vice versa.

Further, in various embodiments, the memory controller 404 may be configured to route a data access from a storage medium expected by the processor to another storage medium. For example, if a data access is made via the processor system memory interface 402n, the processor expects that the data access will occur to system memory (e.g., memory type 1 interface 216, etc.). However, for various reasons, the memory controller 404 may decide that the data access should occur to a different storage medium (e.g., a PRAM, NAND, etc.), and may route the data access as it desires. In such an embodiment, the memory controller 404 may be configured to hide or simply not mention the change in storage medium from the processor.

In another embodiment, the memory controller 404 may be configured to follow or honor the storage medium expectations of the processor; such that all data accesses occurring via the processor system memory interface 402n may occur to the system memory (e.g., memory type 1 interface 216, etc.). It is understood that the above are merely a few illustrative examples to which the disclosed subject matter is not limited.

In various embodiments, the apparatus 400 may include different interfaces (e.g., interface 402n, 402s, etc.) for different processors. In such an embodiment, a multi-processor system may allow greater or even uncongested access to the apparatus 400. In such an embodiment, various processors may employ different communication protocols. It is understood that the above is merely one illustrative example to which the disclosed subject matter is not limited.

Figure 5:
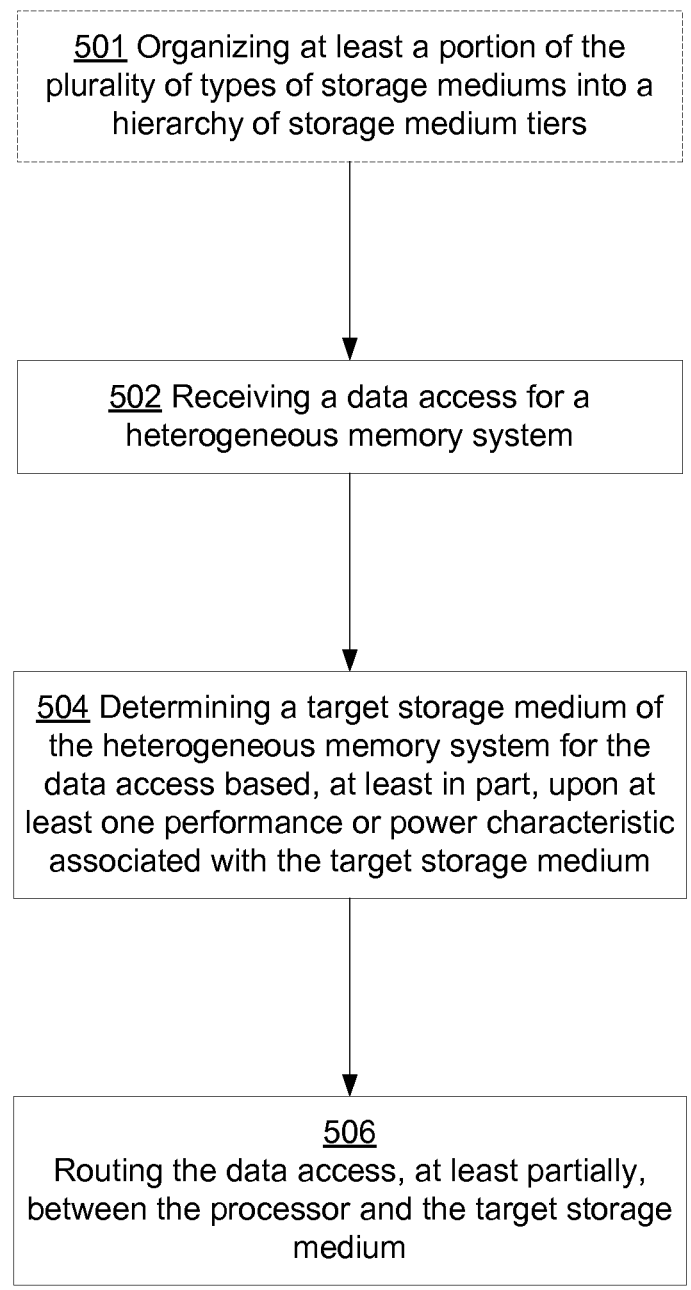
FIG. 5 is a flowchart of an example embodiment of a technique in accordance with the disclosed subject matter.

FIG. 5 is a flow chart of an example embodiment of a technique in accordance with the disclosed subject matter. In various embodiments, the technique 500 may be used or produced by the systems such as those of FIG. 1, 3a, 3b, 3c, or 6. Furthermore, portions of technique 500 may be used or produced by the systems such as that of FIG. 2 or 4. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a data access for a heterogeneous memory system may be received, as described above. In one embodiment, the data access may be received from a processor and by a memory interconnect. In various embodiments, the heterogeneous memory system may comprise a plurality of types of storage mediums, as described above. In some embodiments, each type of storage medium may be based upon a respective memory technology and is associated with one or more performance characteristics, as described above. In various embodiments, the heterogeneous memory system may include a volatile main system memory storage medium and a non-volatile secondary storage medium, as described above.

In various embodiments, the plurality of types of storage mediums may be based upon two or more different memory technologies, as described above. In some embodiments, the plurality of types of storage mediums includes storage mediums based upon three or more different memory technologies selected from a group consisting essentially of: Dynamic Random Access Memory (DRAM), Resistive Random Access Memory (RRAM), Phase change Random Access Memory (PRAM), Magnetic Random Access Memory (MRAM), NAND flash memory, and magnetic storage, as described above.

In one embodiment, receiving may include receiving the data access in a form of a unified access protocol, as described above. In another embodiment, receiving the data access may include receiving a data accesses for a first group of one or more storage mediums via a first access protocol, and receiving a data accesses for a second group of one or more storage mediums via a second access protocol, as described above.

In various embodiments, one or more of the action(s) illustrated by this Block may be performed by the apparatuses or systems of FIG. 1, 2, 3a, 3b, 3c, 4, or 6, the memory interconnect or processor of FIG. 1, 2, 3a, 3b, 3c, or 4, as described above.

Block 504 illustrates that, in one embodiment, a storage medium of the heterogeneous memory system may be determined as the target storage medium for the data access based on various characteristics as described above. In various embodiments, this determination may occur based, at least in part, upon at least one performance characteristic associated with the target storage medium, as described above. In various embodiments, one or more of the action(s) illustrated by this Block may be performed by the apparatuses or systems of FIG. 1, 2, 3*a*, 3*b*, 3*c*, 4, or 6, the memory interconnect of FIG. 1, 2, 3*a*, 3*b*, 3*c*, or 4, as described above.

Block 506 illustrates that, in one embodiment, the data access may be routed, at least partially, between the processor and the target storage medium, as described above. In one embodiment, routing may include translating the data access from the unified access protocol to a storage medium specific protocol employed by the target storage medium, as described above. In various embodiments, receiving the data access may include receiving an indication of a data category associated with the data access. In such an embodiment, routing may include preferentially routing the data to one of the plurality of types of storage mediums based upon the data category, as described above. In some embodiments, the data category associated with the data may be set during a compilation of a software program that, when executed by the processor, causes the data access, as described above. In various embodiments, one or more of the action(s) illustrated by this Block may be performed by the apparatuses or systems of FIG. 1, 2, 3*a*, 3*b*, 3*c*, 4, or 6, the memory interconnect of FIG. 1, 2, 3*a*, 3*b*, 3*c*, or 4, as described above.

Block 501 illustrates that, in one embodiment, at least a portion of the plurality of types of storage mediums may be organized into a hierarchy of storage medium tiers, as described above. In some embodiments, this organization may be based, at least in part upon, the one or more performance characteristic associated with each type of storage medium, as described above. In various embodiments, organizing may include organizing the hierarchy of storage medium tiers into a layered caching memory system, as described above. In such an embodiment, organizing the hierarchy of storage medium tiers into a layered caching memory system may include monitoring the data contents of each storage medium within the layered caching memory system, as described above. In such an embodiment, determining may include determining which, if any, storage mediums, include a piece of data associated with the data access, as described above. In such an embodiment, routing may include routing the data access to a storage medium included within a highest layer of the layered caching memory system that includes the piece of data associated with the data access, as described above. In various embodiments, the technique 500 may further include mirroring the piece of data within a non-volatile layer of the layered caching memory system, if the highest layer of the layered caching memory system that includes the piece of data associated includes a volatile storage medium, as described above.

In some embodiments, the technique 500 may further include dynamically re-organizing the hierarchy of storage medium tiers in response to a triggering event, as described above. In such an embodiment, the triggering event may include an at least partial failure of a compromised storage medium included by the heterogeneous memory system, as described above. In one embodiment, dynamically re-organizing may include reducing a usage of the compromised storage medium, as described above. In various embodiments, one or more of the action(s) illustrated by this Block may be performed by the apparatuses or systems of FIG. 1, 2, 3*a*, 3*b*, 3*c*, 4, or 6, the memory interconnect of FIG. 1, 2, 3*a*, 3*b*, 3*c*, or 4, as described above.

Figure 6:
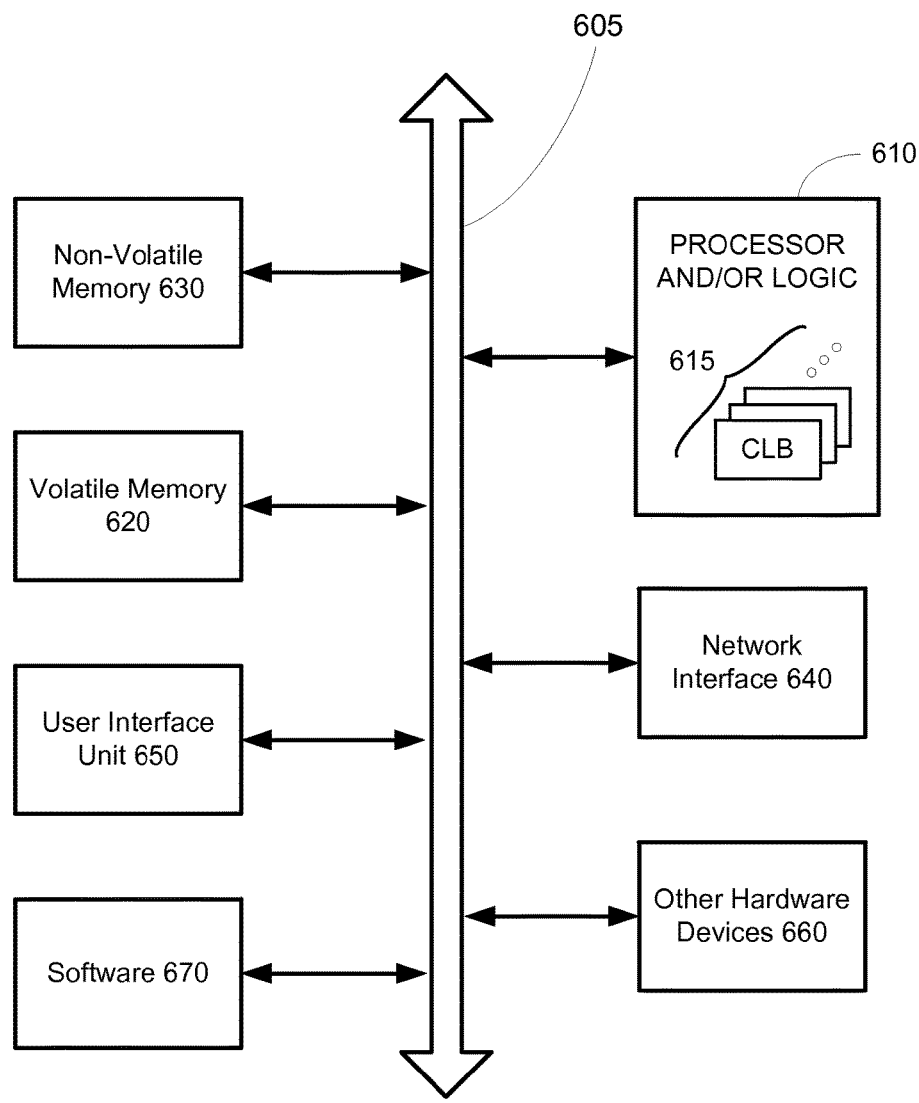
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM), etc.). The information processing system 600 according to the disclosed subject matter may further include a non-volatile memory 630 (e.g., a hard drive, an optical memory, a NAND or Flash memory, etc.). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form. In various embodiments, the volatile memory 620 and/or non-volatile memory 630 may be included a heterogeneous memory system, as described above.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a.

Ethernet), Remote DMA over Converged Ethernet (RoCE), Fibre Channel, Power Line communication (e.g., HomePlug, IEEE 1901, etc.), etc. It is understood that the above are merely a few illustrative examples to which the disclosed subject matter is not limited.

The information processing system 600 according to the disclosed subject matter may further include a user interface unit 650 (e.g., a display adapter, a haptic interface, a human interface device, etc.). In various embodiments, this user interface unit 650 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor, etc.). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640, etc.) of the information processing system 600. In such an embodiment, the information processing system 600 may include one or more native applications, which may be installed locally (e.g., within the non-volatile memory 630, etc.) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (S SOP) technique, a thin small outline package (TS OP) technique, a thin quad flat package (TQFP) technique, a system in package (SIP) technique, a multi-chip package (MCP) technique, a waferlevel fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a processor configured to perform a data access on data stored in a memory system;
a heterogeneous memory system comprising a plurality of storage devices, wherein the plurality of storage devices comprise a plurality of types of storage devices, wherein each type of storage device is based upon a respective memory technology and wherein each respective memory technology is associated with one or more technology-based, physical performance characteristics, and wherein the heterogeneous memory system comprises at least one volatile storage device; and
a memory interconnect configured to:
locally route the data access from the processor to at least one of the plurality of storage devices based, at least in part, upon the one or more performance characteristics associated with the respective memory technologies of the plurality of storage media devices, and
communicate with each of the plurality of storage devices via a native protocol employed by the respective storage device.

2. The apparatus of claim 1, wherein the processor is configured to employ a unified access protocol regardless of the type of storage device employed to store the data.

3. The apparatus of claim 2, wherein the memory interconnect is configured to translate the data access from the unified access protocol employed by the processor to a storage device specific protocol employed by a storage device employed to store the data.

4. The apparatus of claim 1, wherein the plurality of storage devices includes a volatile system memory storage device and a non-volatile secondary storage device.

5. The apparatus of claim 4, wherein the volatile system memory storage device comprises a local, primary storage device for the processor.

6. The apparatus of claim 1, wherein the plurality of types of storage devices are based upon two or more different memory technologies.

7. The apparatus of claim 1, wherein the processor is configured to indicate, via the data access, a data category associated with the data stored in a memory system; and
wherein the memory interconnect is configured to preferentially route the data to one of the plurality of types of storage devices based upon the data category.

8. The apparatus of claim 7, wherein the data category associated with the data is set during a compilation of a software program that, when executed by the processor, accesses the data.

9. The apparatus of claim 1, wherein the memory interconnect is configured to organize at least a portion of the plurality of storage devices into a hierarchy of storage device tiers based, at least in part upon, the one or more performance characteristics associated with each type of storage device.

10. The apparatus of claim 9, wherein the memory interconnect is configured to organize the hierarchy of storage device tiers into a layered caching memory system.

11. The apparatus of claim 9, wherein the memory interconnect is configured to dynamically re-organize the hierarchy of storage device tiers when the apparatus experiences a triggering event.

12. The apparatus of claim 1, wherein the memory interconnect comprises an integrated circuit that includes a memory controller circuit, at least one co-processor, a processor interface, and a plurality of storage device interfaces.

13. The apparatus of claim 1, wherein the processor and memory interconnect are integrated in a single circuit to form a system-on-a-chip.

14. The apparatus of claim 1, wherein the processor comprises the memory interconnect as part of the processor's memory management unit.

15. The apparatus of claim 1, wherein the memory interconnect comprises
a memory controller configured to dynamically make a determination as to how to route the data access, and
at least one co-processor configured to support the memory controller in making the determination,
wherein the memory controller and at least one co-processor are integrated into a single circuit.

16. The apparatus of claim 15, wherein the at least one co-processor includes a direct memory access circuit.

17. The apparatus of claim 1, wherein the memory interconnect routes the data access via a non-frame-based, non-packet-based protocol.

18. The apparatus of claim 1, wherein the memory interconnect is configured to:
receive a data access in a unified, storage medium technology independent format, and
locally route the data access in a native, storage medium technology dependent format.

19. The apparatus of claim 1, wherein the memory interconnect comprises:
a plurality of memory interfaces configured to communicate with the heterogeneous memory system; and
a processing-side interface configured to communicate with the processor.

20. The apparatus of claim 1, wherein the memory interconnect is configured to operate, at least in part, as both a memory controller hub and an input/output controller hub.

21. A method comprising:
receiving, from a processor, a data access for a heterogeneous memory system,
wherein the heterogeneous memory system comprises a plurality of types of storage devices, wherein each type of storage device is based upon a respective memory technology and is associated with one or more performance characteristic;
determining, by a memory interconnect, a target storage device of the heterogeneous memory system for the data access based, at least in part, upon at least one performance characteristic associated with the target storage device; and
locally routing, by the memory interconnect, the data access, at least partially, between the processor and the target storage device, wherein the memory interconnect transmits the data access to the target storage device formatted via a protocol native to the target storage device.

22. The method of claim 21, wherein receiving the data access from the processor comprises:
receiving a data accesses for a first group of one or more storage devices via a first access protocol, and
receiving a data accesses for a second group of one or more storage devices via a second access protocol.

23. The method of claim 21, further comprising organizing at least a portion of the plurality of types of storage devices into a hierarchy of storage device tiers based, at least in part upon, the one or more performance characteristic associated with each type of storage device.

24. The method of claim 23, wherein organizing includes organizing the hierarchy of storage device tiers into a layered caching memory system,
wherein organizing the hierarchy of storage device tiers into a layered caching memory system includes monitoring the data accesses made to each storage device within the layered caching memory system, and
wherein determining includes determining which, if any, storage devices, include a piece of data associated with the data access.

25. The method of claim 23, wherein organizing includes organizing the hierarchy of storage device tiers into a layered caching memory system,
further including mirroring a piece of data within a non-volatile layer of the layered caching memory system, if the highest layer of the layered caching memory system that includes the piece of data includes a volatile storage device.

26. An apparatus comprising:
a processor interface configured to receive a data access directed for a heterogeneous memory system;
a plurality of storage device interfaces, each configured to communicate with at least one storage device of the heterogeneous memory system, and each storage device interface being associated with at least one performance characteristic, wherein the heterogeneous memory system comprises a plurality of types of storage devices; and a memory controller configured to:

locally route the data access from the processor interface to a one of the plurality of storage device interfaces based, at least in part, upon at least one performance characteristic associated with the one of the plurality of storage device interfaces.

27. The apparatus of claim 26, further comprising:

at least one accelerator processor configured to assist the memory controller route the data access from the processor interface to the one of the plurality of storage device interfaces.

28. The apparatus of claim 27, wherein the at least one accelerator processor includes an encryption circuit configured to encrypt at least a data portion of the data access before the data access is routed to the one of the plurality of storage device interfaces.

29. The apparatus of claim 27, wherein the at least one accelerator processor includes protocol translation circuit configured to translate the data access from a first communications protocol to a second communication protocol, before the data access is routed to the one of the plurality of storage device interfaces.

30. The apparatus of claim 27, wherein the at least one accelerator processor includes a cache organizer circuit configured to:

organize the heterogeneous memory system into a layered caching memory system, maintain an inventory of the layered caching memory system, and providing information regarding the layered caching memory system to the memory controller; and wherein the memory controller is configured to select the one of the plurality of storage device interfaces based, at least in part, upon the information regarding the layered caching memory system provided by the cache organizer circuit.

* * * * *